(12) United States Patent
Deffler

(10) Patent No.: US 8,706,759 B2
(45) Date of Patent: Apr. 22, 2014

(54) METHOD AND SYSTEM FOR DISPLAYING MESSAGES IN CONTEXT

(75) Inventor: Tad A. Deffler, Boonton, NJ (US)

(73) Assignee: CA, Inc., Islandia, NY (US)

( * ) Notice: Subject to any disclaimer, the term of this patent is extended or adjusted under 35 U.S.C. 154(b) by 1878 days.

(21) Appl. No.: 11/733,348

(22) Filed: Apr. 10, 2007

(65) Prior Publication Data

US 2007/0242624 A1  Oct. 18, 2007

Related U.S. Application Data

(60) Provisional application No. 60/745,076, filed on Apr. 18, 2006.

(51) Int. Cl.
*G06F 7/00* (2006.01)
*G06F 17/30* (2006.01)

(52) U.S. Cl.
USPC .......................... 707/778; 707/797; 707/803

(58) Field of Classification Search
USPC .......... 709/203, 207, 219, 227; 707/4, 8, 100, 707/102, 103 R, 769, 778, 797, 803; 714/38, 714/47–48, 57; 715/708, 738, 779, 715/810–811, 818, 853
See application file for complete search history.

(56) References Cited

U.S. PATENT DOCUMENTS

| | | | |
|---|---|---|---|
| 6,144,962 A * | 11/2000 | Weinberg et al. ..................... 1/1 |
| 2001/0042059 A1* | 11/2001 | Uehara et al. ..................... 707/1 |
| 2003/0004960 A1* | 1/2003 | Pressmar ..................... 707/100 |
| 2005/0049924 A1* | 3/2005 | DeBettencourt et al. ........ 705/21 |
| 2007/0179890 A1* | 8/2007 | Sandford et al. ................ 705/44 |
| 2008/0091491 A1* | 4/2008 | Thorpe et al. ..................... 705/7 |
| 2008/0288608 A1* | 11/2008 | Johnson ........................ 709/213 |

* cited by examiner

*Primary Examiner* — Sherief Badawi
*Assistant Examiner* — Berhanu Mitiku
(74) *Attorney, Agent, or Firm* — Baker Botts, LLP

(57) ABSTRACT

The present disclosure is directed to a method and system for displaying messages in context. In accordance with a particular embodiment of the present disclosure at least one transaction notification is received. At least one node for the at least one transaction notification is generated. The node is stored in a hierarchical tree data structure.

18 Claims, 4 Drawing Sheets

*FIG. 1A*

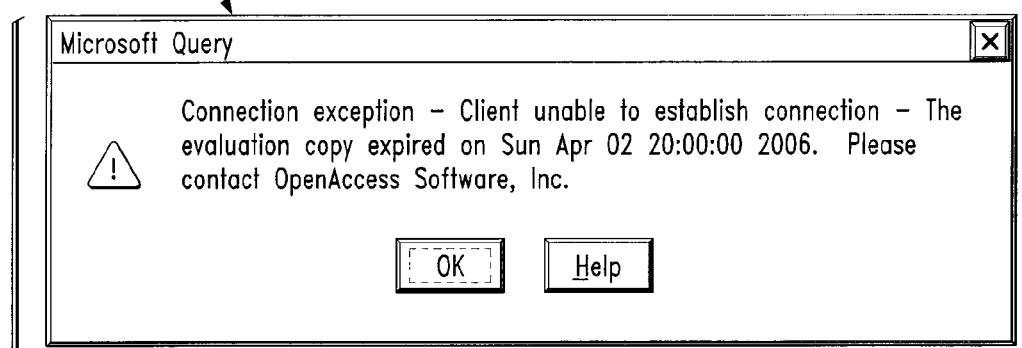

*FIG. 1B*

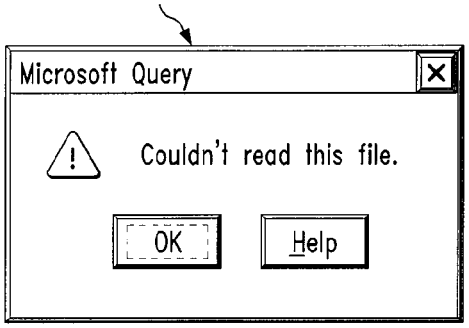

```
Compiling...
test.cpp
c:\temp\test\test.cpp(11) = error C2628= 'a' followed by 'int' is illegal (did you forget a ';' ?)
c:\temp\test\test.cpp(12) = warning C4326= return type of 'main' should be 'int or void' instead of 'a'
c:\temp\test\test.cpp(14) = error C2440= 'return' = cannot convert from 'int' to 'a'
        No constructor could take the source type, or constructor overload resolution was ambiguous
```

*FIG. 1C*

```
Compiling...
test.cpp
c:\temp\test\test.cpp(11) = error C2628= 'a' followed by 'int' is illegal (did you forget a ';' ?)
c:\temp\test\test.cpp(12) = warning C4326= return type of 'main' should be 'int or void' instead of 'a'
c:\temp\test\test.cpp(14) = error C2143= syntax error = missing ';' before 'return'
c:\temp\test\test.cpp(14) = error C2440= 'return' = cannot convert from 'int' to 'a'
        No constructor could take the source type, or constructor overload resolution was ambiguous
```

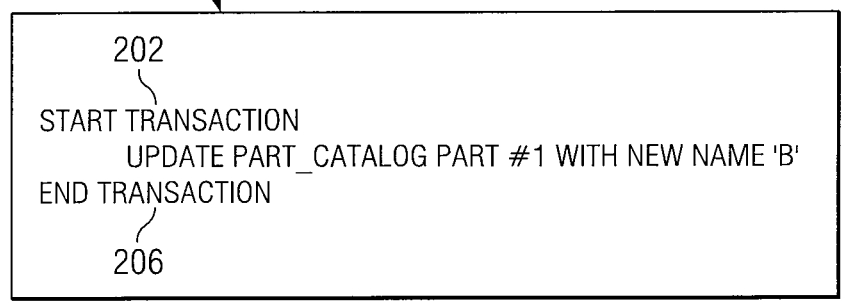

202  
START TRANSACTION  
    UPDATE PART_CATALOG PART #1 WITH NEW NAME 'B'  
END TRANSACTION  
206

FIG. 2B

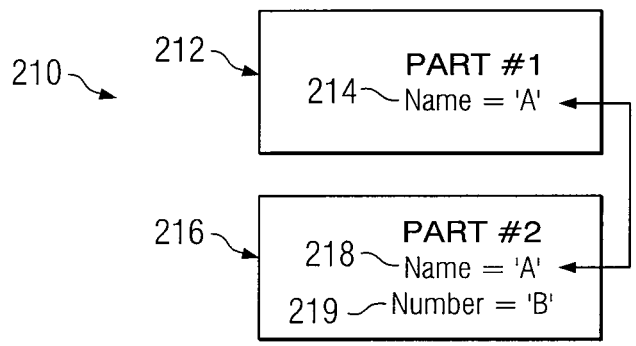

210  
212 → PART #1  
214 — Name = 'A'  
216 → PART #2  
218 — Name = 'A'  
219 — Number = 'B'

222 — 1. Linked attributes keep their names synchronized.  
224 — 2. Multiple attributes assigned to the same part are merged into a single attribute if they have the same name.  
226 — 3. Only attributes with the same data type can be merged.

RULES FOR TRANSACTIONS

232 — "Dissimilar data types"  
234 — "Cannot Merge"  
236 — "Cannot Synchronize Names"  
238 — "Cannot Rename"

METHOD AND SYSTEM FOR DISPLAYING MESSAGES IN CONTEXT

CROSS REFERENCE TO RELATED APPLICATIONS

This application claims the benefit of priority under 35 U.S.C. §119(e) of U.S. Provisional Patent Application Ser. No. 60/745,076 entitled "Method and System for Displaying Informative Text in Context," which was filed on Apr. 18, 2006.

TECHNICAL FIELD

The present disclosure relates generally to displaying messages, and more particularly to a method and system for displaying messages in context.

BACKGROUND

Many applications display informative messages to the user from time to time. One common category of message is a warning or error message indicating a problem, or problems, with an action taken by the user. In many cases, multiple messages can result from an operation performed or attempted by a user. For example, in a system where one action by the user might trigger a large number of actual actions in the software, and where that software has a highly complex set of rules, the action may trigger a large number of error messages. Therefore, the cause-and-effect relationship between the action performed or attempted by the user (cause) and the error (effect) may be difficult to determine.

SUMMARY

In accordance with the present disclosure, the disadvantages and problems associated with previous techniques for displaying messages in context may be reduced or eliminated.

In accordance with a particular embodiment of the present disclosure, a method for displaying messages in context includes receiving at least one transaction notification. The method also includes generating at least one node for the at least one transaction notification. The method further includes storing the at least one node in a hierarchical tree data structure.

Technical advantages of particular embodiments of the present disclosure include a system and method for displaying messages in context that stores causality information in a hierarchical tree data structure. For example, when the system receives notification of a transaction start, it stores a node in the hierarchical tree data structure. When a transaction issues a message, the system may add the message to the current node in the tree. When the last transaction closes, the tree may be displayed to allow a user to identify causality information.

Another technical advantage of particular embodiments of the present disclosure includes a system and method for displaying messages in context that allows a user to drill down through the nodes of the hierarchical tree in order to find the cause of a message represented by a higher-level node. Thus, the system managing the messages can display both the specific operation that caused the message and the operation that triggered the causing operation.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which:

FIG. 1A is a pictorial depiction of example messages resulting from a transaction;

FIG. 1B is a pictorial depiction of example compilation messages;

FIG. 1C is another pictorial depiction of example compilation error messages;

FIG. 2A is a pictorial depiction of an example transaction;

FIG. 2B is a block diagram illustrating an example part catalog;

FIG. 2C is a pictorial depiction of three example rules for transactions on the part catalog of FIG. 2B;

FIG. 2D is a pictorial depiction of example error messages;

DESCRIPTION OF EXAMPLE EMBODIMENTS

Figure 3:
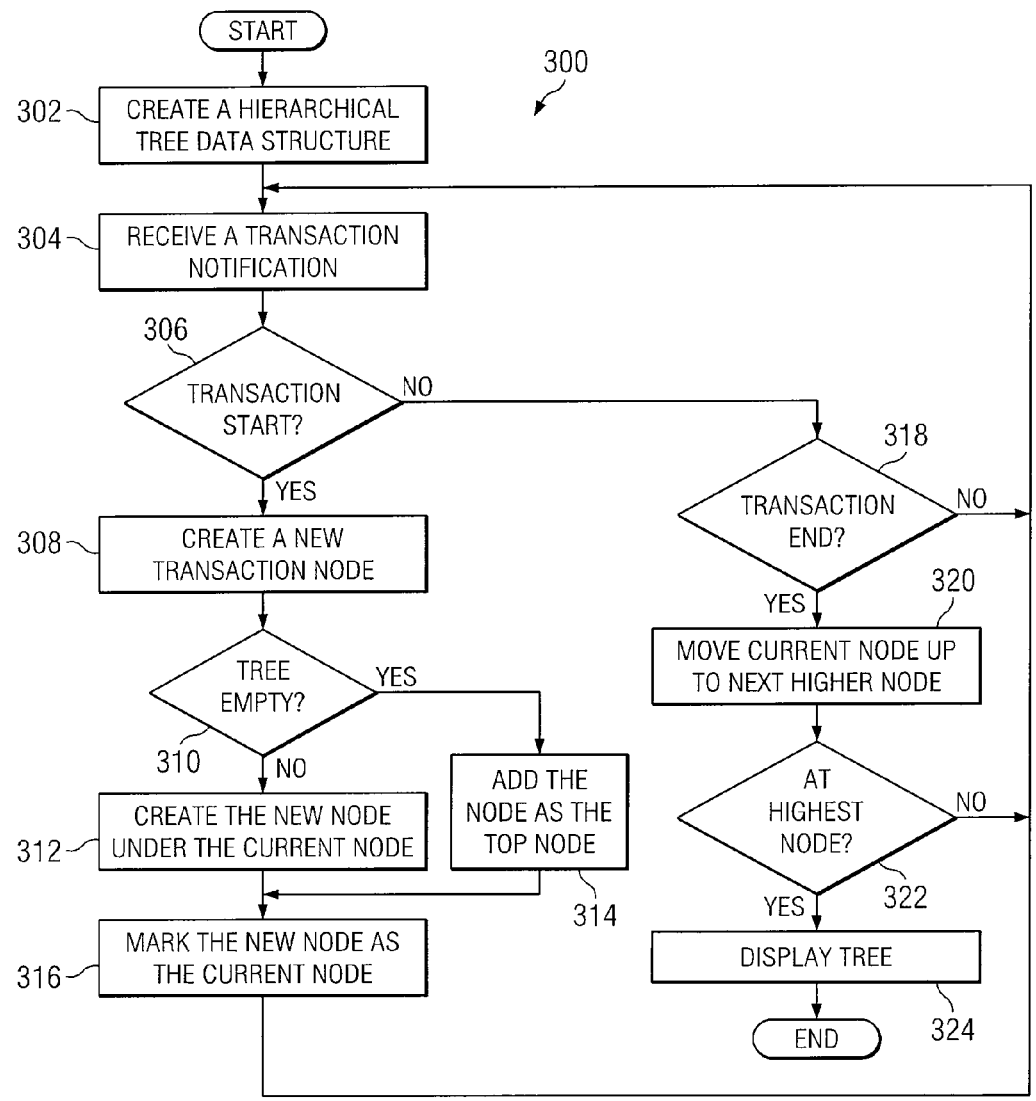
FIG. 3 is a flow diagram illustrating a method for displaying messages in context, according to one embodiment of the present disclosure.

Error, warning, or information messages in software applications are typically displayed on an individual basis (e.g., a pop-up message box or an entry on the status bar) or they are displayed in a flat list (e.g., compiler warnings). These approaches often prevent the user from recognizing cause and effect relationships between the messages.

For example, most Microsoft Windows ("Windows") applications display informative messages to the user from time to time. One common category of message is a warning or error message indicating a problem, or problems, with an action that the user has taken. In many cases, multiple messages can result from an operation. As an example, using Microsoft Excel to query a database for which the license has expired might produce two messages to the user, such as the messages displayed in FIG. 1A.

In this example, the cause-and-effect relationship between the messages may be relatively obvious to the user. However, in a system where one action by the user might trigger a large number of additional actions in the software, and/or where that software has a highly complex set of rules, the cause-and-effect relationship may be very difficult to determine.

As another example, a compiler is a piece of software that converts human-readable text ("source code") into machine-readable computer instructions. When the user of a compiler operates the software ("compiles"), the software will perform a large number of analyses and conversions on the source code, and the rules, which the source code must follow, are generally extremely numerous.

FIG. 1B is a pictorial depiction of example compilation error messages. The messages may be a result an error made in the source code. The output format of this set of messages is a list rather than individual message boxes.

In the example of FIG. 1B, the cause-and-effect relationship between the messages may not be readily ascertainable by the user. In this particular case, all three messages are a result of a missing semi-colon in the source code.

FIG. 1C is another pictorial depiction of example compilation error messages. The output illustrated in FIG. 1C is an example of error messages resulting from having two errors in the source code. Since all the messages indicate possible missing semi-colons, and half of the messages indicate problems with 'return' statements, it may be difficult to decipher which messages are side-effects of (e.g., caused by) problems reported earlier in the output.

Except in the most trivial cases, most programmers faced with the output of FIG. 1C may simply fix the problem in the first message and then rerun the compile to see if other messages disappeared (had the same initial cause) or remained (had a separate initial cause). This can be extremely inefficient and time-consuming.

The examples of FIGS. 1B and 1C involve a situation where all the problems result from direct actions taken by the user. For example, the user typed in bad source code. In some software, a user's overt actions may cause further actions inside the software that the user did not explicitly initiate. They may not even be aware that these actions were taking place.

FIG. 2A is a pictorial depiction of an example transaction 200. As described in more detail below, transaction 200 may cause further actions that transaction 200 did not explicitly initiate. The term transaction refers to boundary markers that are placed around an action, or a group of actions, to denote that the actions should be considered atomic—i.e., as a single unit. The most common example of this would be in the area of relational database systems, where transactions are used to make sure that changes in one part of the database are only applied if related changes in another part can also be applied. In "pseudo" SQL, an example of this might look something like the following Table 1, where the system cannot update a part catalog if it cannot update the associated pricing list.

TABLE 1

Pseudo SQL with Flat Transactions

START TRANSACTION
   UPDATE PART_CATALOG WITH NEW PART#
   UPDATE PRICING_LIST WITH NEW PART#
END TRANSACTION

The term hierarchical refers to the ability to nest one transaction inside another. A nested transaction is one that, if successful, is considered an atomic unit by the containing transaction. If we modified the previous example to allow for the possibility that the part does not exist, then we might have "pseudo" SQL as shown in the following Table 2.

TABLE 2

Pseudo SQL with Nested Transactions

START TRANSACTION
  START TRANSACTION
    UPDATE PART_CATALOG WITH NEW PART#
  END TRANSACTION
  IF NOT FAIL, START TRANSACTION

TABLE 2-continued

Pseudo SQL with Nested Transactions

UPDATE PRICING_LIST WITH NEW PART#
  END TRANSACTION
END TRANSACTION

Transaction 200 in FIG. 2A contains a start action 202, and an end action 206. FIG. 2B is a block diagram illustrating an example part catalog 210. Part catalog 210 includes a Part #1 212 that has Name 'A' 214. Part #2 216 has Name 'A' 218, Number 'B' 219, and Name 'A' 218 of Part #2 is linked to Name 'A' 214 of Part #1. FIG. 2C is a pictorial depiction of three example rules 220 for transactions on the part catalog of FIG. 2B;

For example, if a user attempts to change Part #1's Name 214 from 'A' to 'B', Rule #1 222 attempts to change Part #2's Name 218 from 'A' to 'B' in response. Next, Rule #2 224 attempts to merge the Name 218 and Number 219 of Part #2 216 as they have the same name 'B'. However, Rule #3 226 prohibits this merge.

The resulting error messages 230 may be shown as in FIG. 2D. For example, the failure of Rule #3 226 will generate an error message 232. The cascading failure to Rule #2 224 will also generate a message 234. The cascading failure to Rule #1 222 will also generate a message 236. Finally, this will cascade to a failure of the original user action, the rename action, generating a fourth message 238. Thus, FIG. 2D illustrates messages resulting from indirect actions taken inside the rules of the part catalog that the user didn't explicitly initiate. In this situation, the cause-and-effect relationship between the messages is also not obvious to the user.

In accordance with the teachings of the present disclosure, an application is provided with the ability to generate a hierarchical tree data structure of nested transactions on the data changes in order to provide context for messages. Thus, the teachings of the present disclosure allow the application to represent cascading messages in a manner that indicates cause-and-effect. For example when a message is generated, the mechanism managing the messages is able to determine both the specific operation that caused the message and the operation that triggered the causing operation. This determination is fully recursive so that the causality chain can be traced back to the initial operation initiated by the user.

This causality information is stored in a hierarchical tree data structure that allows branches from a single stem without forming loops. The tree may be displayed to the user to allow the user to drill down through the nodes of the tree in order to find the cause of a message represented by a higher-level node.

The hierarchical tree data structure benefits from the presence of a hierarchical transaction mechanism that manages the changes to the application's state. This mechanism should expose a means for notifying the application when a transaction is being started and when a transaction is being ended. Examples of one such transaction mechanism is described in U.S. Pat. No. 6,859,919 entitled "OBJECT MODELING TOOL WITH META MODEL SEMANTIC REGISTRY (RULES) A META DATA MANAGER FOR OBJECT(S) PROPERTIES AN OBJECT/PROPERTY INTERFACE FOR INSTANCE(S) OF OBJECTS/PROPERTIES RECEIVED VIA OBJECT/PROPERTY INTERFACE OF THE OBJECT FACTORY REGISTRY."

FIG. 3 is a flow diagram illustrating a method 300 for displaying messages in context, according to one embodiment of the present disclosure. Method 300 may use a hierarchical transaction mechanism to manage the changes to an application's state. This mechanism exposes a means for notifying applications when a transaction starts and when a transaction ends. When a component in the application wishes to issue a message to the user, the present disclosure receives the notification for the transaction and binds it as a node in a hierarchical tree. Further, the present disclosure is operable to nest one transaction node inside another. A nested transaction is one that, if successful, is considered a unit by the containing transaction.

Figure 4A:
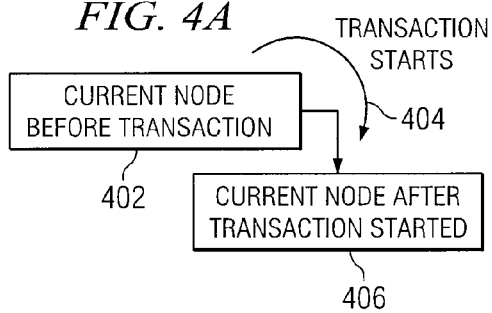
FIG. 4A is a block diagram illustrating a current node data pointer for new transaction nodes.

Method 300 begins in step 302 by creating a hierarchical tree data structure to store transaction nodes. When method 300 receives a transaction notification at step 304, method 300 determines if it is a notification of a transaction start at step 306. If it is a transaction start, method 300 creates a new transaction node at step 308 and assigns a current node data pointer to the new transaction node. The current node data pointer refers to any suitable pointer that is associated with an executing transaction. Thus, if the tree is currently empty, then the method treats the new node as the root node in step 314. However, if the tree is not currently empty, method 300 places the new node under the current node data pointer in step 312. Thus, the current node data pointer may be updated to reference the new node, also referred to as the child node, in step 316 as shown by reference number 404 in FIG. 4A.

Figure 4B:
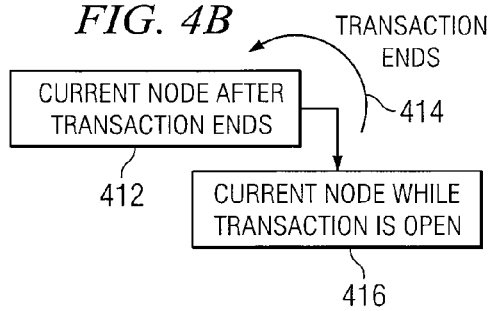
FIG. 4B is a block diagram illustrating a current node data pointer for updated transaction nodes.

When method 300 receives notification of a transaction end at step 318, method 300 moves the designation of the current node data pointer to the next higher node, also referred to as the parent node, in the tree in step 320 as shown by reference number 414 in FIG. 4B. If there is no higher node at step 322, the tree of messages is processed for display to the user at step 324. That is, when the outermost transaction ends, the method processes the tree for display.

Figure 5:
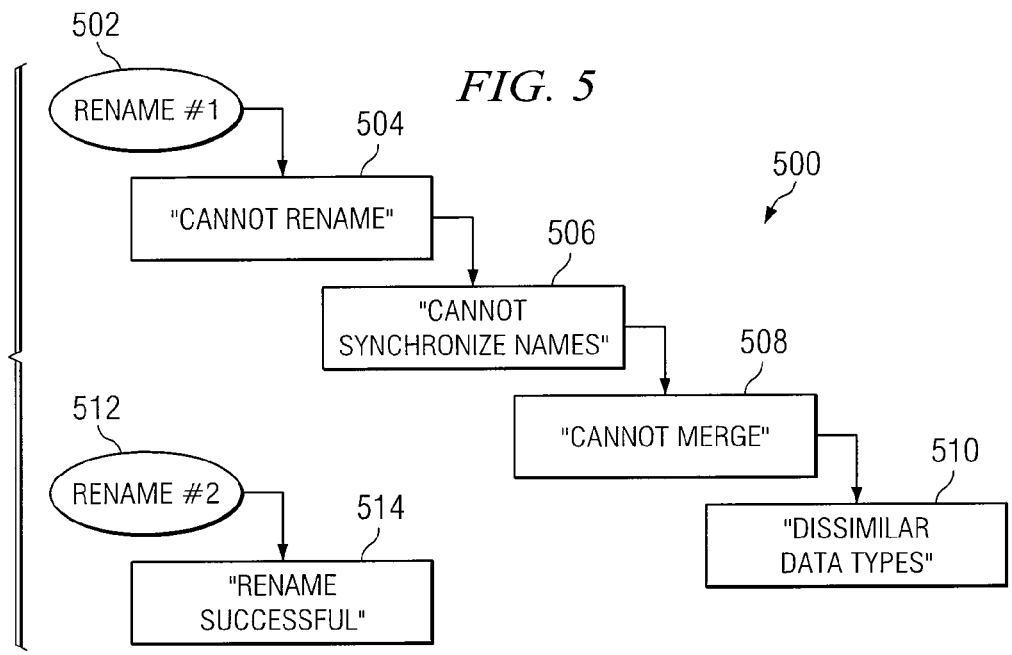
FIG. 5 is a block diagram illustrating two example hierarchical trees generated using the method from FIG. 3.

FIG. 5 is a block diagram illustrating two example hierarchical trees generated using method 300 from FIG. 3. As a first example using the part catalog example from FIGS. 2A-2D, a transaction 502 of renaming a part from a part catalog generates a first node 504. Next, attempting to change a second part's name generates node 506 in the tree. Node 506 is nested underneath node 504 because the tree is not empty. In addition, after the first rule executes, node 506 is the current node in the tree and may be referenced with a current node data pointer. Next, the second rule attempts to merge the names of the parts, and generates node 508 as a nested node under node 506. Finally, the third rule prohibits the merge because the of the dissimilar data types. The failure of the third rule will generate an error message stored in node 510.

Figure 6:
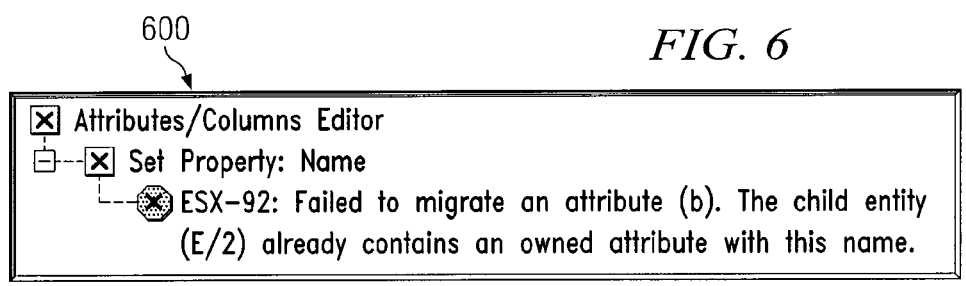
FIG. 6 is a pictorial depiction of example output from a transaction tree.

The cascading failure to the second rule will also generate a message in node 508. The cascading failure to the first rule will also generate a message in node 506. Finally, this will cascade to a failure of the original user action, the rename, generating a fourth message in node 504. The tree is then processed for display for the user and the resulting display may be shown as in FIG. 6.

As a second example, if a transaction 512 to rename the part was successful, the method displays a single transaction node 514 for the user because the node was the highest and current node at the end of the processing loop.

Figure 7:
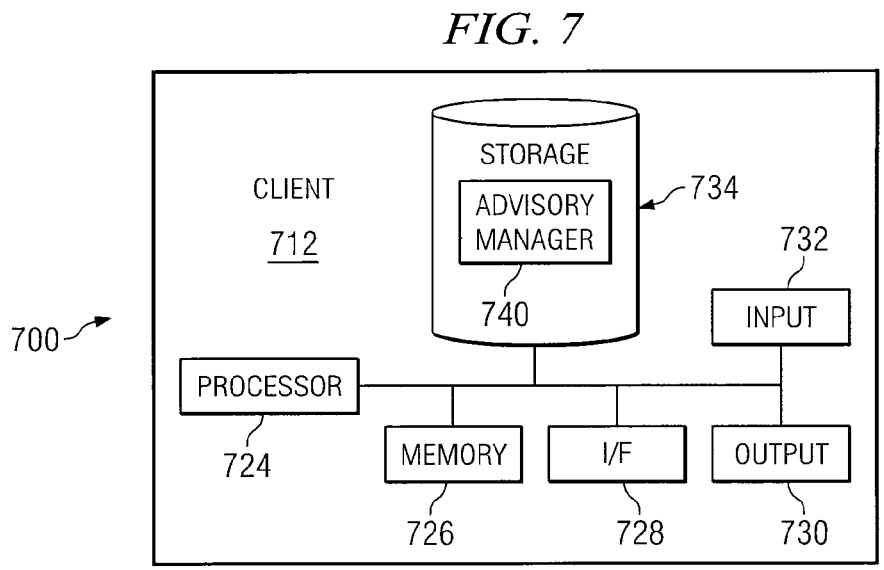
FIG. 7 is a block diagram illustrating a system for displaying messages in context, according to one embodiment of the present disclosure.

FIG. 7 is a block diagram illustrating a system 700 for displaying messages in context, according to one embodiment of the present disclosure. System 700 and each component thereof may comprise hardware, software, and/or logic encoded in media that is capable of implementing the method of FIG. 3 and/or other aspects of the teachings of the present disclosure. In the illustrated embodiment, system 700 includes a client 712, a memory device 726, a communication interface (I/F) 728, an output device 730, an input device 732, and a storage device 734. Storage device 734 includes an advisory manager 740. Additional details of the components of client 712 are described below.

Processor 724 may refer to any suitable device operable to execute instructions and manipulate data to perform operations for client 712. Processor 724 may include, for example, any type of central processing unit (CPU).

Memory device 726 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

I/F 728 may refer to any suitable device operable to receive input, send output, perform suitable processing of the input or output or both, communicate to other devices, or any combination of the preceding. Communication interface 728 may include appropriate hardware (e.g. modem, network interface card, etc.) and software, including protocol conversion and data processing capabilities, to communicate through a LAN, WAN, or other communication system that allows client 712 to communicate to other devices. Communication interface 728 may include one or more ports, conversion software, or both.

Output device 730 may refer to any suitable device operable for displaying information to a user. Output device 730 may include, for example, a video display, a printer, a plotter, or other suitable output device.

Input device 732 may refer to any suitable device operable to input, select, and/or manipulate various data and information. Input device 732 may include, for example, a keyboard, mouse, graphics tablet, joystick, light pen, microphone, scanner, or other suitable input device.

Storage device 734 may refer to any suitable device operable for storing data and instructions. Storage device 734 may include, for example, a magnetic disk, flash memory, or optical disk, or other suitable data storage device.

Advisory manager 740 may refer to any suitable hardware and/or logic embodied in computer-readable media, and when executed, that is operable to display messages in context as described above with reference to FIG. 3. In the illustrated embodiment of the disclosure, advisory manager 740 resides in storage device 734. In other embodiments of the disclosure, advisory manager 740 may reside in memory device 726, or any other suitable device operable to store and facilitate retrieval of data and instructions.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for displaying messages in context, comprising:
generating a first node associated with a first transaction, the first transaction corresponding to an executable application;
receiving a first transaction notification for the first transaction;
storing the first transaction notification in the first node, the transaction notification comprising an output of the executable application;

generating a hierarchical tree data structure comprising at least the first node and at least a second node, the first node being a child node of the second node in the hierarchical tree data structure, the second node associated with a second transaction, the first transaction being a nested transaction initiated by the second transaction; and establishing a current node data pointer, wherein the current node data pointer references a particular node in the hierarchical tree data structure, wherein the particular node is associated with an executing transaction.

2. The method of claim 1, further comprising updating the current node data pointer to reference a child node in the hierarchical tree data structure.

3. The method of claim 1, further comprising updating the current node data pointer to reference a parent node in the hierarchical tree data structure.

4. The method of claim 1, wherein storing the at least one node in the hierarchical tree data structure comprises storing the at least one node under the node referenced by the current node data pointer.

5. The method of claim 1, further comprising adding a transaction message to the at least one node.

6. The method of claim 1, further comprising displaying the hierarchical tree data structure.

7. A system for displaying messages in context, comprising:
   a storage device; and
   a processor, the processor operable to execute a program of instructions operable to:
      generate a first node associated with a first transaction, the first transaction corresponding to an executable application;
      receive a first transaction notification for the first transaction;
      store the first transaction notification in the first node, the transaction notification comprising an output of the executable application;
      generate a hierarchical tree data structure comprising at least the first node and at least a second node, the first node being a child node of the second node in the hierarchical tree data structure, the second node associated with a second transaction, the first transaction being a nested transaction initiated by the second transaction; and
      establish a current node data pointer, wherein the current node data pointer references a particular node in the hierarchical tree data structure, wherein the particular node is associated with an executing transaction.

8. The system of claim 7, wherein the program of instructions is further operable to update the current node data pointer to reference a child node in the hierarchical tree data structure.

9. The system of claim 7, wherein the program of instructions is further operable to update the current node data pointer to reference a parent node in the hierarchical tree data structure.

10. The system of claim 7, wherein the program of instructions is further operable to store the at least one node under the node referenced by the current node data pointer.

11. The system of claim 7, wherein the program of instructions is further operable to add a transaction message to the at least one node.

12. The system of claim 7, wherein the program of instructions is further operable to display the hierarchical tree data structure.

13. Logic encoded in media, the logic being operable, when executed on a processor, to:
   generate a first node associated with a first transaction, the first transaction corresponding to an executable application;
   receive a first transaction notification for the first transaction;
   store the first transaction notification in the first node, the transaction notification comprising an output of the executable application;
   generate a hierarchical tree data structure comprising at least the first node and at least a second node, the first node being a child node of the second node in the hierarchical tree data structure, the second node associated with a second transaction, the first transaction being a nested transaction initiated by the second transaction;
   establish a current node data pointer, wherein the current node data pointer references a particular node in the hierarchical tree data structure, wherein the particular node is associated with an executing transaction.

14. The logic of claim 13, wherein the logic is further operable to update the current node data pointer to reference a child node in the hierarchical tree data structure.

15. The logic of claim 13, wherein the logic is further operable to update the current node data pointer to reference a parent node in the hierarchical tree data structure.

16. The logic of claim 13, wherein the logic is further operable to store the at least one node under the node referenced by the current node data pointer.

17. The logic of claim 13, wherein the logic is further operable to add a transaction message to the at least one node.

18. The logic of claim 13, wherein the logic is further operable to display the hierarchical tree data structure.

* * * * *